US011957110B2

(12) United States Patent
Nifong et al.

(10) Patent No.: US 11,957,110 B2
(45) Date of Patent: *Apr. 16, 2024

(54) PEST RESISTANT BIRDFEEDER

(71) Applicant: CLASSIC BRANDS, LLC, Denver, CO (US)

(72) Inventors: Lindsey Nifong, Denver, CO (US); Stephen Combs, Denver, CO (US)

(73) Assignee: CLASSIC BRANDS, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,706

(22) Filed: Dec. 22, 2022

(65) Prior Publication Data

US 2023/0130715 A1  Apr. 27, 2023

Related U.S. Application Data

(63) Continuation of application No. 16/565,012, filed on Sep. 9, 2019, now Pat. No. 11,533,892.

(60) Provisional application No. 62/729,821, filed on Sep. 11, 2018.

(51) Int. Cl.
*A01K 39/01* (2006.01)
*A01K 39/012* (2006.01)

(52) U.S. Cl.
CPC ........ *A01K 39/0113* (2013.01); *A01K 39/012* (2013.01)

(58) Field of Classification Search
CPC .. A01K 39/0113; A01K 39/012; A01K 39/01; A01K 31/12

See application file for complete search history.

(56) References Cited

U.S. PATENT DOCUMENTS

| 3,241,525 | A  | 3/1966  | Meier |
| 4,541,362 | A  | 9/1985  | Dehls |
| 4,846,111 | A  | 7/1989  | Kilham |
| 5,048,461 | A  | 9/1991  | Wessner |
| 5,105,765 | A  | 4/1992  | Loken |
| 5,195,460 | A  | 3/1993  | Loken |
| 5,207,181 | A  | 5/1993  | Loken |
| 5,255,631 | A  | 10/1993 | Anderson |
| 5,947,054 | A  | 9/1999  | Liethen |
| 6,415,737 | B2 | 7/2002  | Banyas et al. |
| 6,578,518 | B1 | 6/2003  | Conforti |

(Continued)

OTHER PUBLICATIONS

Office Action for Canadian Application No. 3,055,049 dated Jan. 7, 2021 (4 pages).

*Primary Examiner* — Trinh T Nguyen
(74) *Attorney, Agent, or Firm* — Polsinelli PC

(57) ABSTRACT

The present technology provides systems and methods for resisting intrusion of a pest into a supply of bird seed held in a birdfeeder. In one implementation, a base has a surface extending to a base edge. A perch has a body extending from a perch first end to a perch second end. The perch body is disposed relative to a slot. A collapsible member is mounted to the base at a first attachment point. The first attachment point is disposed inward relative to the base edge. The collapsible member is mounted to the perch at a second attachment point. The collapsible member has a pivot point defined between the first attachment point and the second attachment point. The collapsible member moves the perch from a feeding position to a non-feeding position by pivoting at the pivot point upon an application of a force above a threshold on the perch body.

20 Claims, 20 Drawing Sheets

(56) References Cited

U.S. PATENT DOCUMENTS

| | | |
|---|---|---|
| 6,622,654 B2 | 9/2003 | Fasino |
| 7,448,346 B1 | 11/2008 | Stone et al. |
| 7,694,652 B2 | 4/2010 | Fahey |
| 8,807,081 B1 | 8/2014 | Gage et al. |
| 8,931,435 B2 | 1/2015 | Hepp et al. |
| 8,978,586 B1 | 3/2015 | Carter et al. |
| 9,131,665 B2 | 9/2015 | Mackelvie |
| RE48,343 E | 12/2020 | Donegan et al. |
| 11,213,018 B2 | 1/2022 | Bruno et al. |
| 2001/0029898 A1 | 10/2001 | Banyas et al. |
| 2003/0136347 A1 | 7/2003 | Fasino |
| 2015/0320017 A1 | 11/2015 | Hepp et al. |
| 2016/0205902 A1 | 7/2016 | Donegan et al. |
| 2016/0255819 A1 | 9/2016 | Faunce |

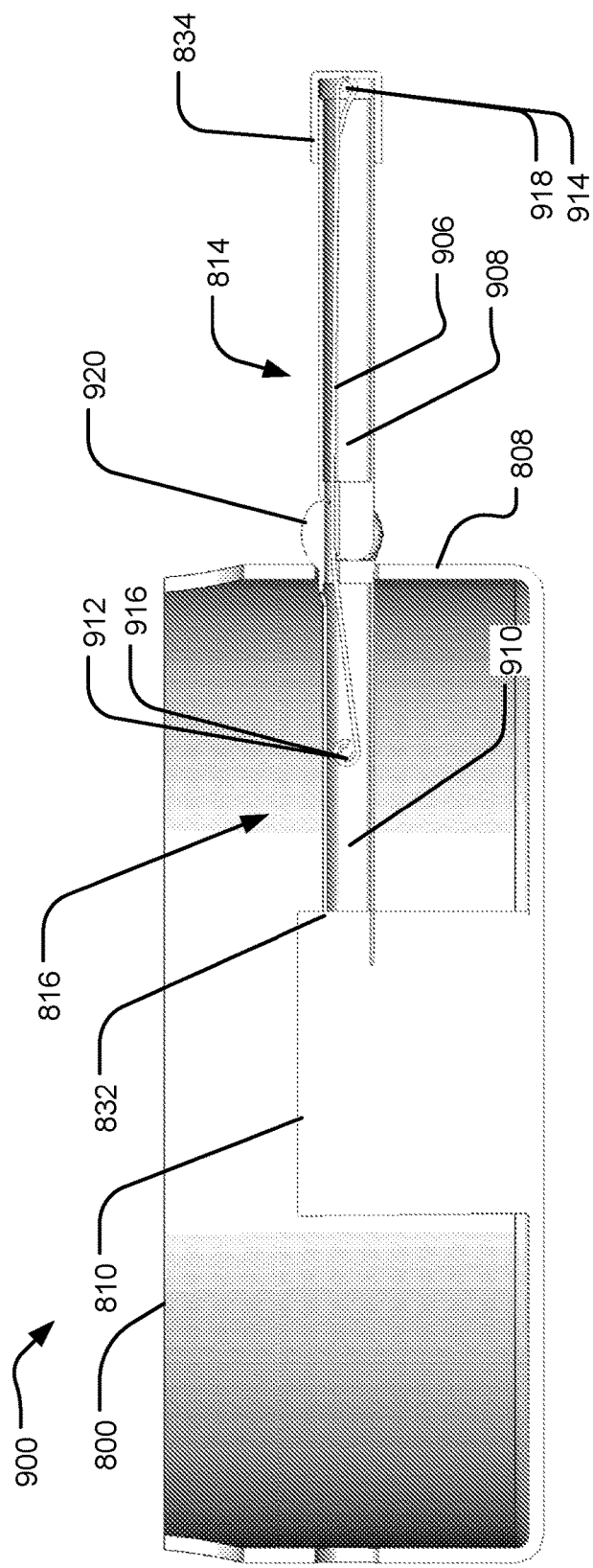
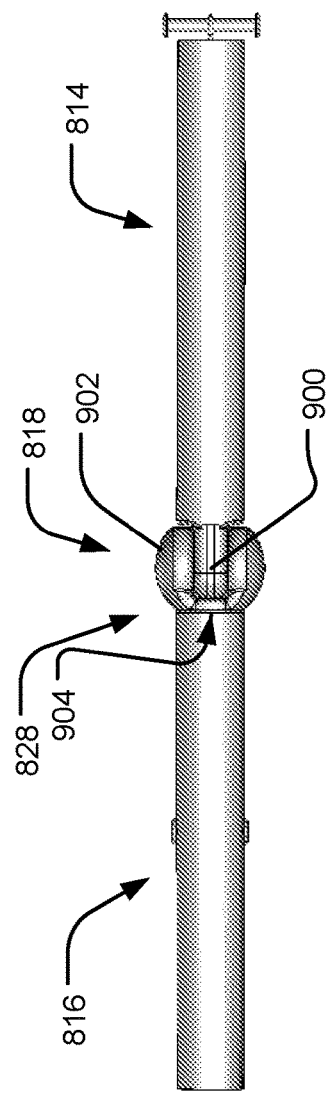
FIG. 9A
FIG. 9B

PEST RESISTANT BIRDFEEDER

CROSS-REFERENCE TO RELATED APPLICATIONS

The present application is a continuation of and claims priority to U.S. Non-Provisional application Ser. No. 16/565,012, entitled "Pest Resistant Birdfeeder" and filed on Sep. 9, 2019, which claims priority to U.S. Provisional Application No. 62/729,821, entitled "Pest Resistant Birdfeeder" and filed on Sep. 11, 2018. Each of these applications is specifically incorporated by reference herein in its entirety.

TECHNICAL FIELD

Aspects of the present disclosure relate generally to resistance to intrusion by pests, such as squirrels or large birds, into a supply of bird food in a bird feeder.

BACKGROUND

Attracting wild birds, particularly song birds, using bird feeders is an increasingly popular hobby. The ability to attract desired birds may be limited, however, where the area in which the bird feeder is stationed is frequented by pests, such as squirrels and larger birds including magpies. Many conventional bird feeders are susceptible to such pests accessing and consuming bird food in the bird feeder, thereby discouraging wild birds from visiting the bird feeder and greatly increasing the costs associated with the hobby by having to replace the consumed bird food in shorter intervals. These challenges are exacerbated in attempting to distinguish between wild birds and pests, such as squirrels, to ensure that the bird food is not denied to the wild birds. It is with these observations in mind, among others, that various aspects of the present disclosure were conceived and developed.

SUMMARY

Implementations described and claimed herein address the foregoing problems by providing systems and methods for resisting intrusion of a pest into a supply of bird seed held in a birdfeeder. In one implementation, a base has a base surface extending to a base edge. A slot is defined in the base. A perch has a perch body extending from a perch first end to a perch second end, and the perch body is disposed relative to the slot. A collapsible member is mounted to the base at a first attachment point. The first attachment point is disposed inward relative to the base edge. The collapsible member is mounted to the perch at a second attachment point, and the collapsible member has a pivot point defined between the first attachment point and the second attachment point. The collapsible member moves the perch from a feeding position to a non-feeding position by pivoting at the pivot point upon an application of a force above a threshold on the perch body of the perch.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modification in various aspects, all without departing from the spirit and scope of the presently disclosed technology. Accordingly, the drawings and detailed description are to be regarded as illustrative in nature and not limiting.

BRIEF DESCRIPTION OF THE FIGURES

FIG. 9A is a side, cross-sectional view of the collapsible perch shown in FIG. 8;

FIG. 9B is a top detailed view of the collapsible perch shown in FIG. 8;

DETAILED DESCRIPTION

Aspects of the presently disclosed technology relate to systems and methods for resisting intrusion by a pest, such as a squirrel, scavenger bird, and/or the like. In one aspect, a birdfeeder includes a housing with a base attached at one end and a cap attached at another end. The housing includes one or more feeder openings to provide access to feed stored in an interior of the housing. The one or more openings may include a seed port to prevent seed from falling out. A perch may be disposed below the openings and the seed ports to provide a landing surface for a bird to perch and access the feed. The perch may collapse when the perch experiences a force from a pest that is greater than a threshold force, thereby preventing the pest from accessing the feed. More specifically, the perch may be fixed at a fixed point to a portion of the base or to a point inside the birdfeeder and collapse at a pivot point spaced away from the fixed point. Thus, a birdfeeder with a collapsible perch for selective feeding of birds is provided.

Figure 1:
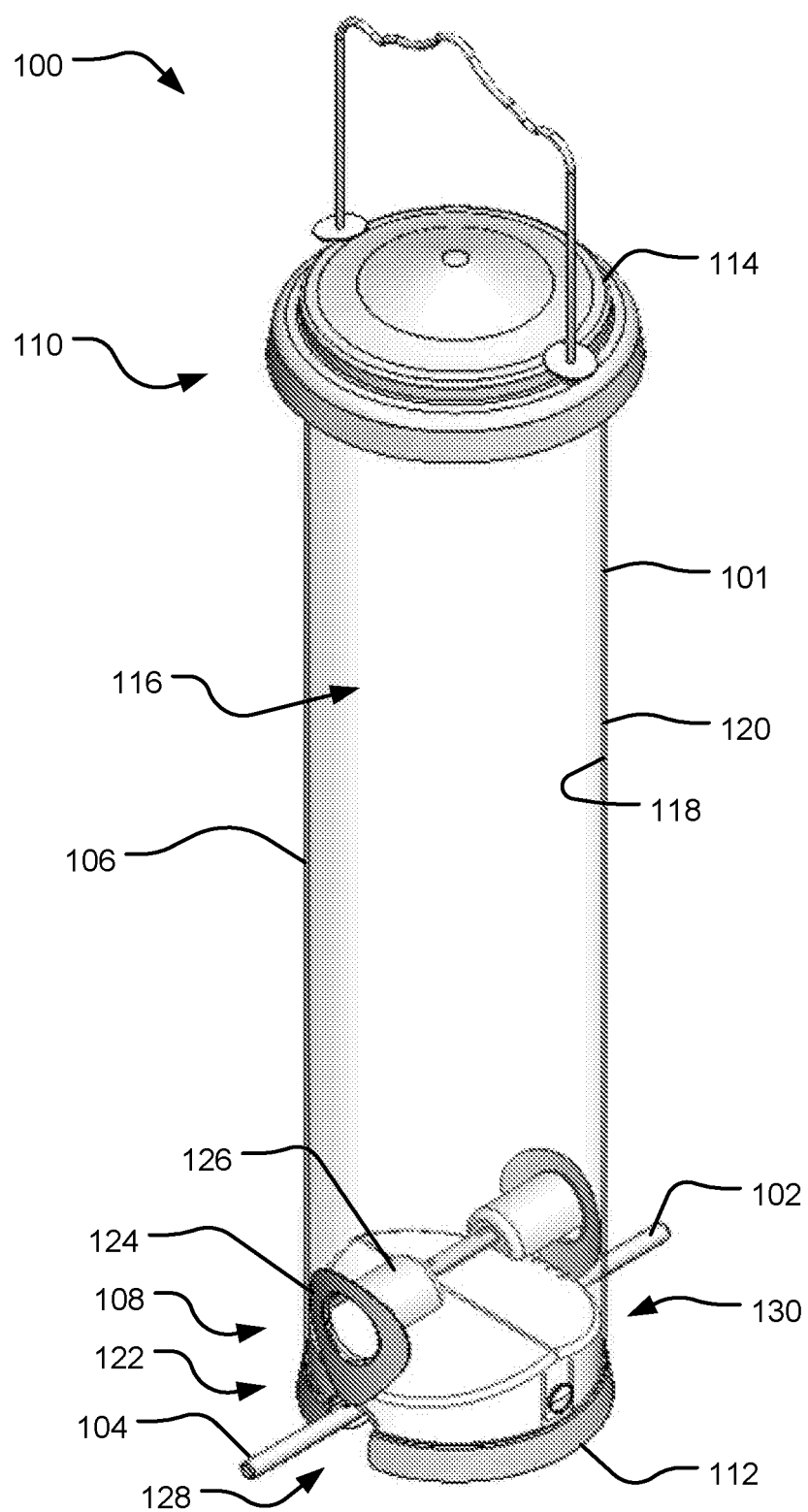
FIG. 1 is a perspective view of a birdfeeder with a pair of example collapsible perches.

Referring to FIG. 1, a birdfeeder 100 with a pair of perches having a first perch 102 and a second perch 104 is illustrated. The birdfeeder 100 includes a housing having a reservoir 101, a base 112, and a cap 114. In one implementation, the reservoir 101 has a side wall 106 extending from a first end 108 to a second end 110. The side wall 106 defines an interior reservoir 116, which receives and stores feed. The interior reservoir 116 is occluded by the base 112 that is coupled to the first end 108 and the cap 114 that is coupled to the second end 110. The side wall 106 also includes a first surface 118 facing the interior reservoir 116 and a second surface 120 facing away from the interior reservoir 116. At least one feeder opening 122 is disposed on the side wall 106 to provide access to the feed stored in the interior reservoir 116. A seed port 124 may be disposed at the feeder opening 122. The seed port 124 may have a hood 126 to control and/or prevent feed from falling out of the interior reservoir 116. The pair of perches 102, 104 may be disposed under each seed port 124 at a pair of perch openings 128, 130 and provide a surface for a bird to perch while accessing the feed stored in the interior reservoir 116.

Figure 2:
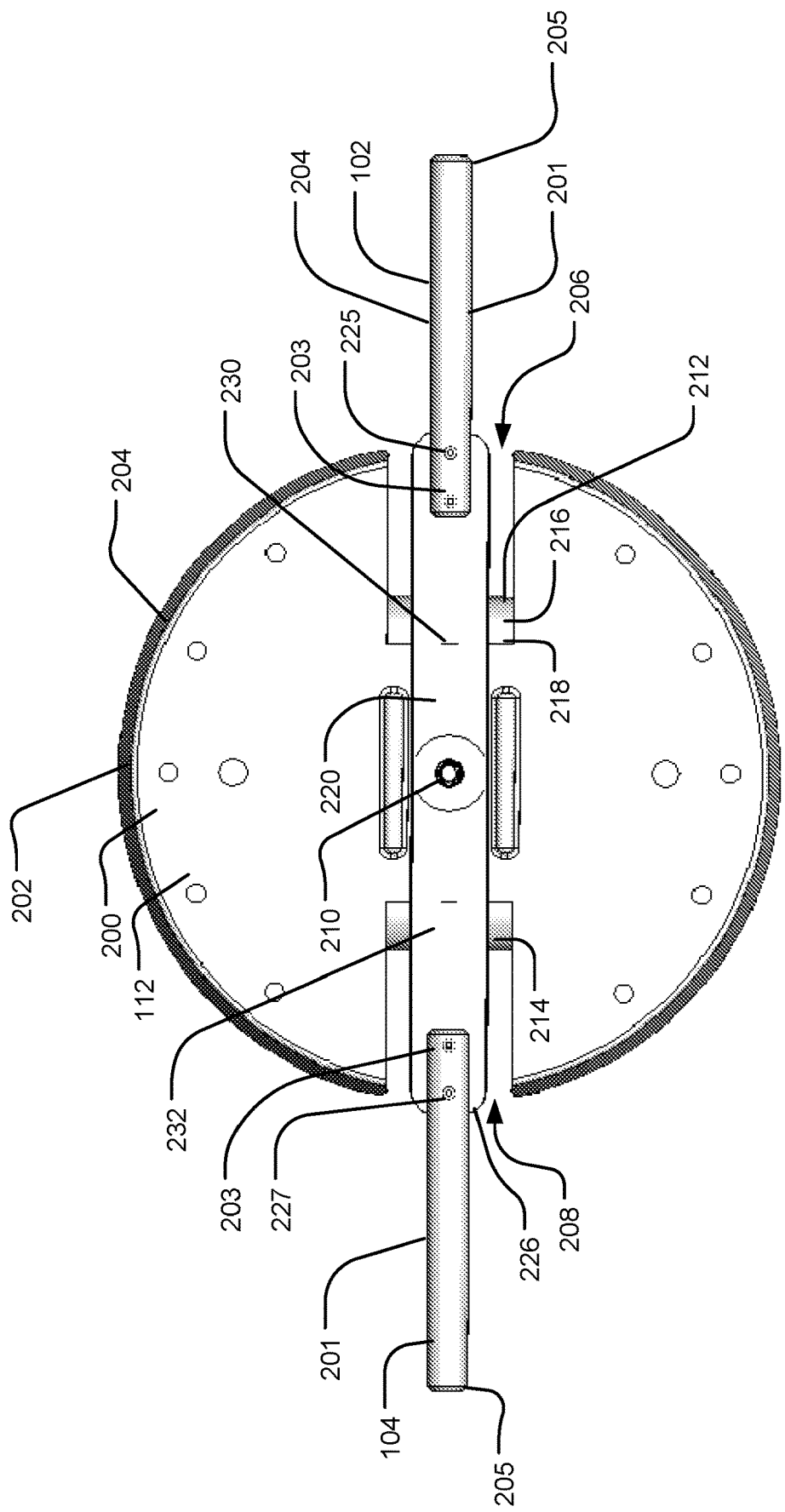
FIG. 2 is a top view of a base and the pair of collapsible perches shown in FIG. 1.
Figure 3:
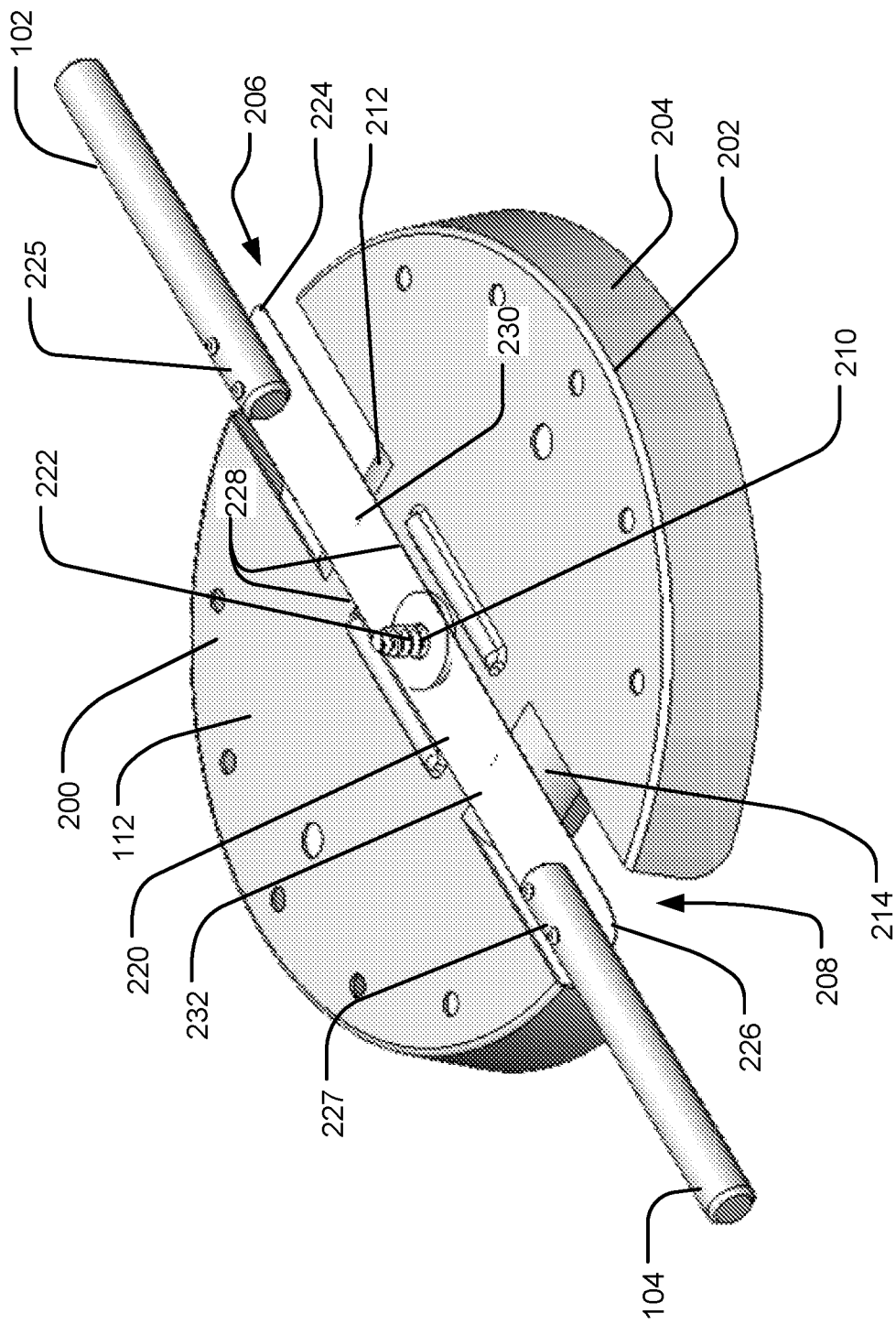
FIG. 3 is a perspective view of the base and the pair of collapsible perches shown in FIG. 2.

FIGS. 2-3 illustrate a top view and a perspective view of the base 112 and the pair of perches 102, 104 coupled to a collapsible member 220. Each of the pair of perches 102, 104 includes a perch surface 201 and a perch first end 203 and a perch second end 205 opposite the perch first end 203. The base 112 is generally circular with a base surface 200 extending to a perimeter 202. The base includes a wall 204 extending from the base surface 200 at the perimeter 202. A pair of slots having a first slot 206 and a second slot 208 extend from opposing sides of the base 112 from the perimeter 202 towards a center 210 of the base 112. The pair of slots 206, 208 provides an opening in the base 112 for the collapsible member 220 to collapse through such that a collapsing path of each end of the collapsing member 220 passes through each of the pair of slots 206, 208. The pair of slots 206, 208 extends to a pair of stops having a first stop 212 and a second stop 214. Each of the pair of stops 212, 214 includes a tab 216 extending from the base surface 200 in the same direction as the wall 204. The tab 216 includes a surface stop 218, which engages the collapsible member 220 when the collapsible member 220 is collapsed and prevents the collapsible member 220 from further collapse.

The collapsible member 220 is fastened to a center attachment point 222 located at the center 210 of the base 112. The collapsible member 220 extends in opposing directions to a member first end 224 and a member second end 226. The first perch 102 first end 203 is coupled to the member first end 224 and the second perch 104 first end 203 is coupled to the member second end 226. The pair of perches 102, 104 may be coupled to the member first end 224 at a first attachment point 225 and the member second end 226 at a second attachment point 227, respectively, by fasteners such as screws, rivets, or the like, or by adhesion. In an example implementation, the pair of perches 102, 104 and the collapsible member 220 is one piece. The collapsible member 220 may be manufactured from a material that is biased to an initial position with a biasing force generated by the material and is also bendable such that when the material receives a force greater than the biasing force, the material will bend, and when the force is lifted, the material will return to its biased initial position. Such material may be a thin strip of stainless steel, among other examples.

Figure 4:
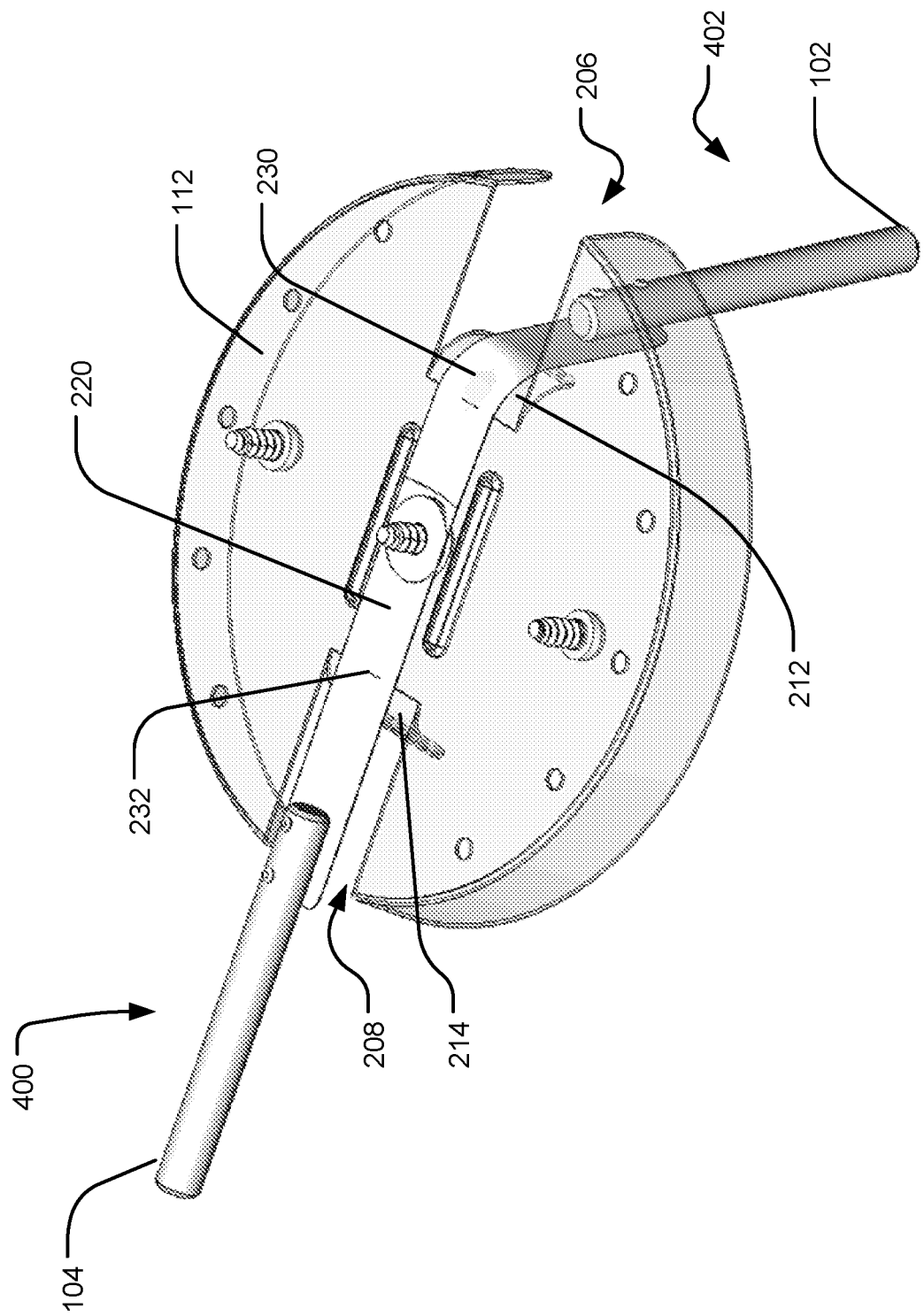
FIG. 4 is top, tilted view of the base and the pair of collapsible perches shown in FIG. 2 with one of the perches collapsed and the base shown transparent.
Figure 5A:
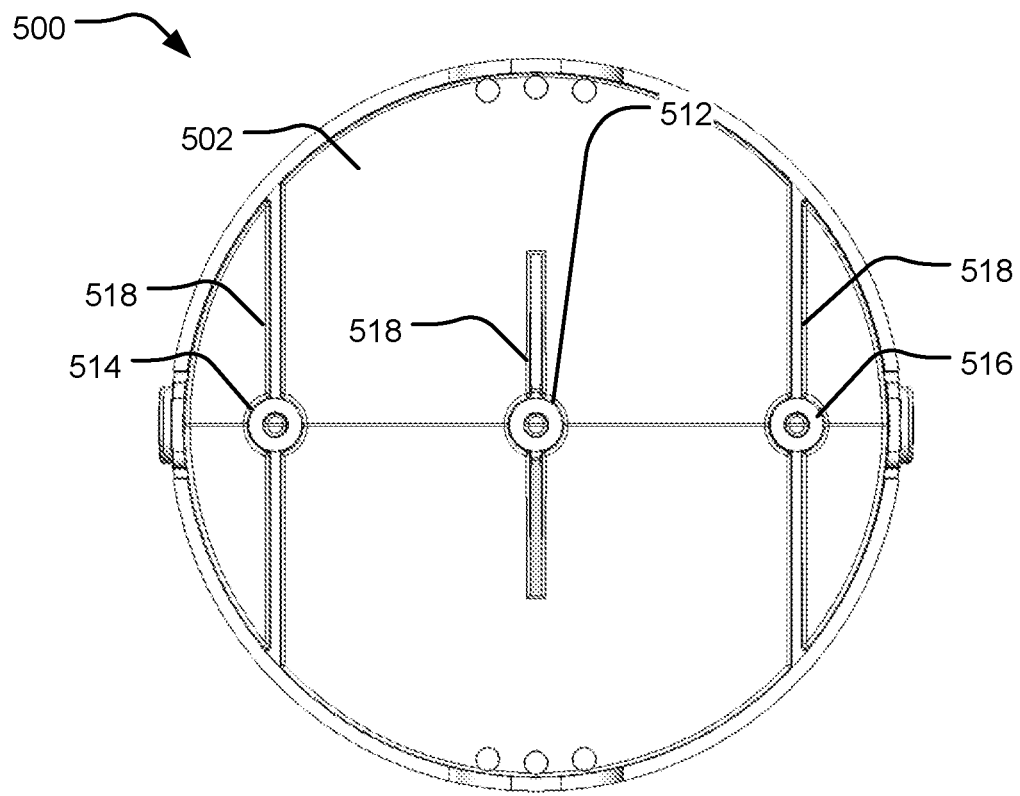
FIGS. 5A-B are a top view and a top, tilted view, respectively of a base cover of the birdfeeder shown in FIG. 1.
Figure 5B:
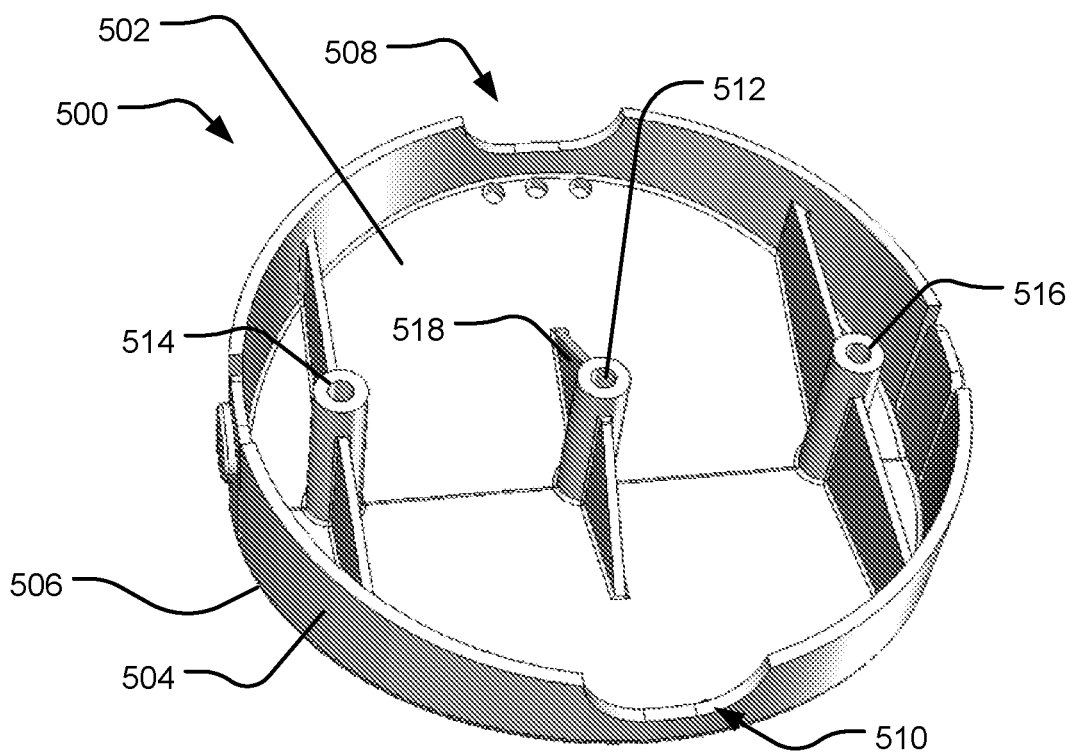
Figure 6:
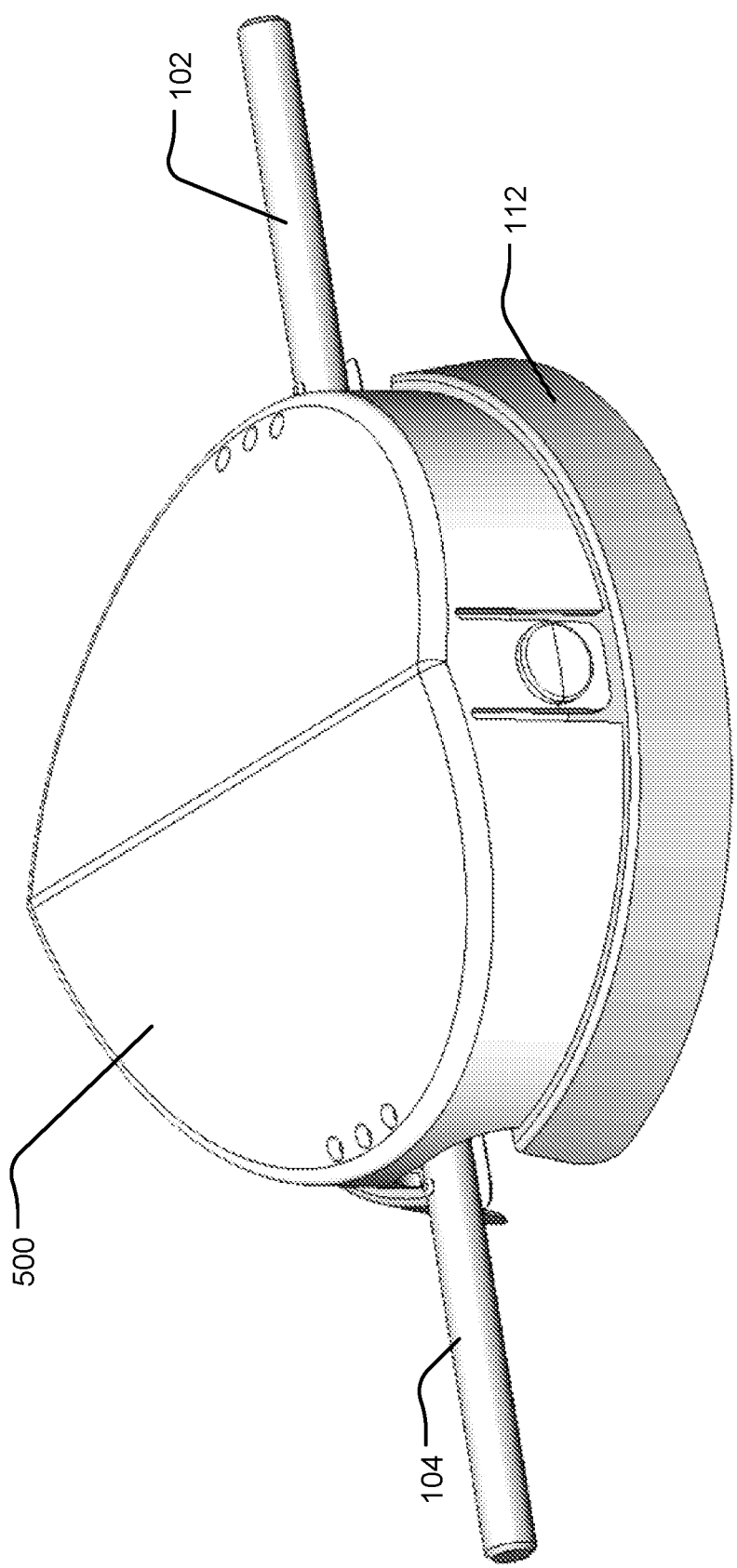
FIG. 6 is a perspective view of the base cover coupled to the base shown in FIG. 1.
Figure 7:
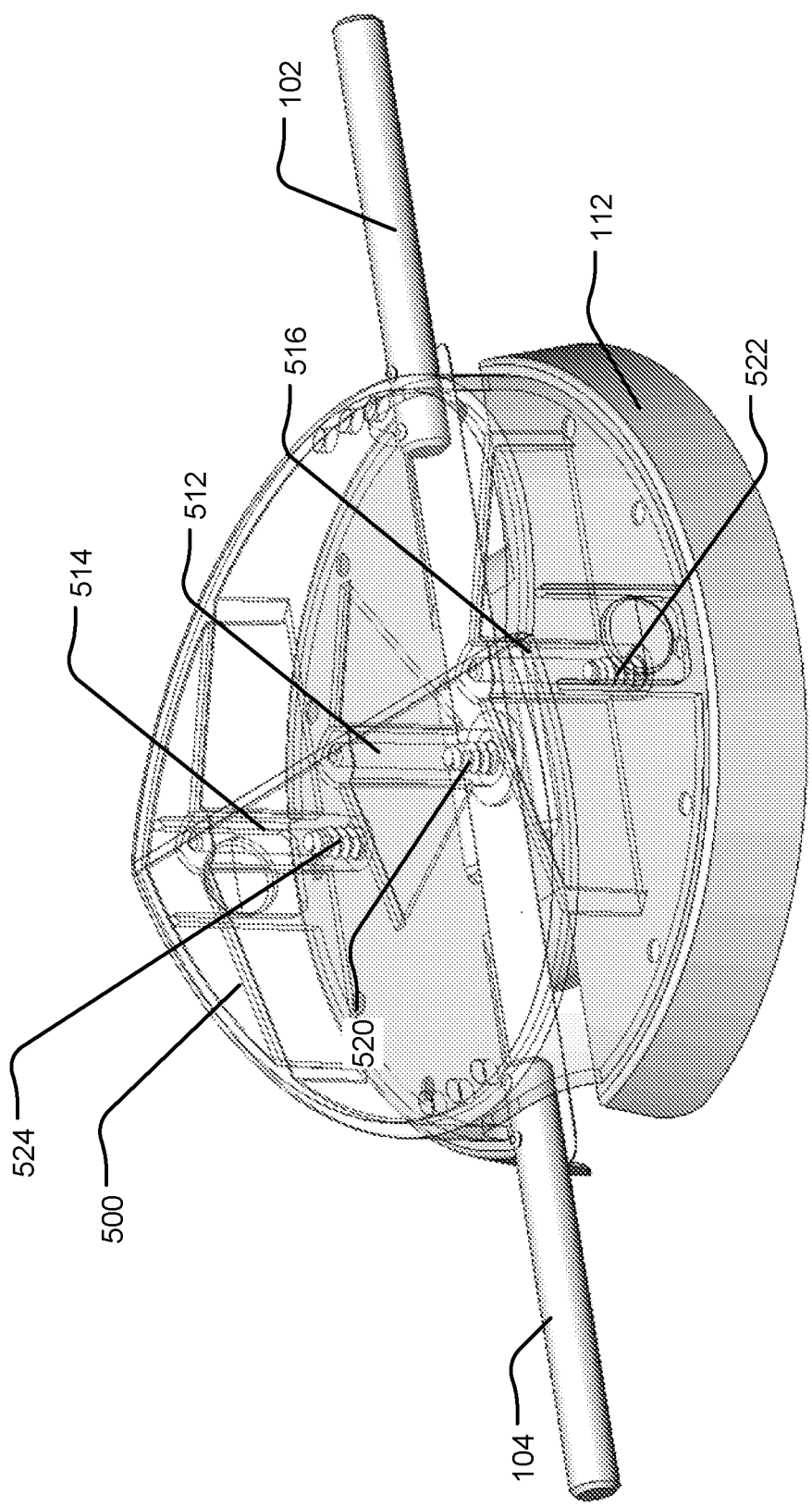
FIG. 7 is another perspective view of the base cover coupled to the base shown in FIG. 6, with the base cover shown transparent.
Figure 8:
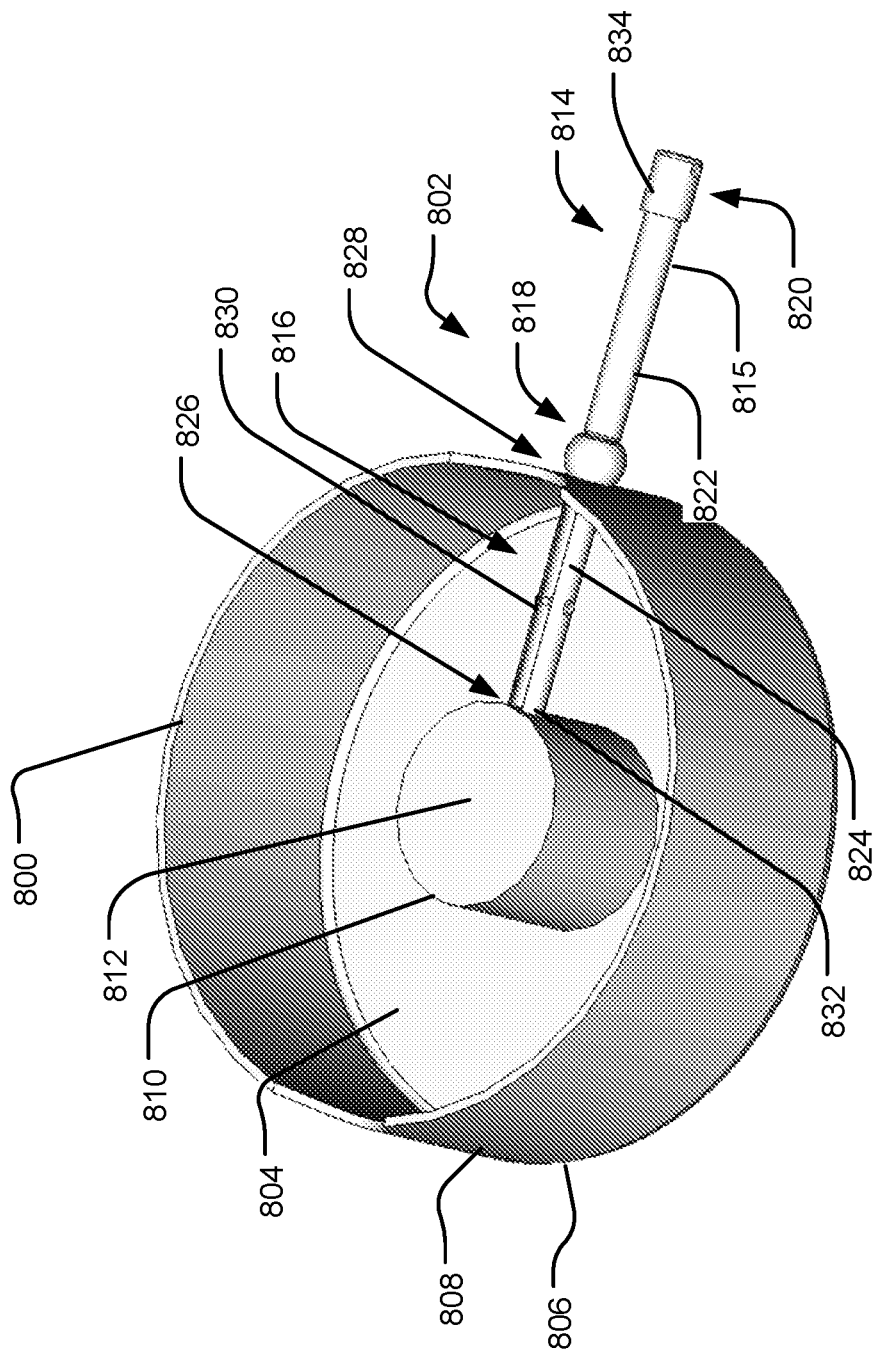
FIG. 8 is a perspective view of another implementation of a collapsible perch and a base.
Figure 10:
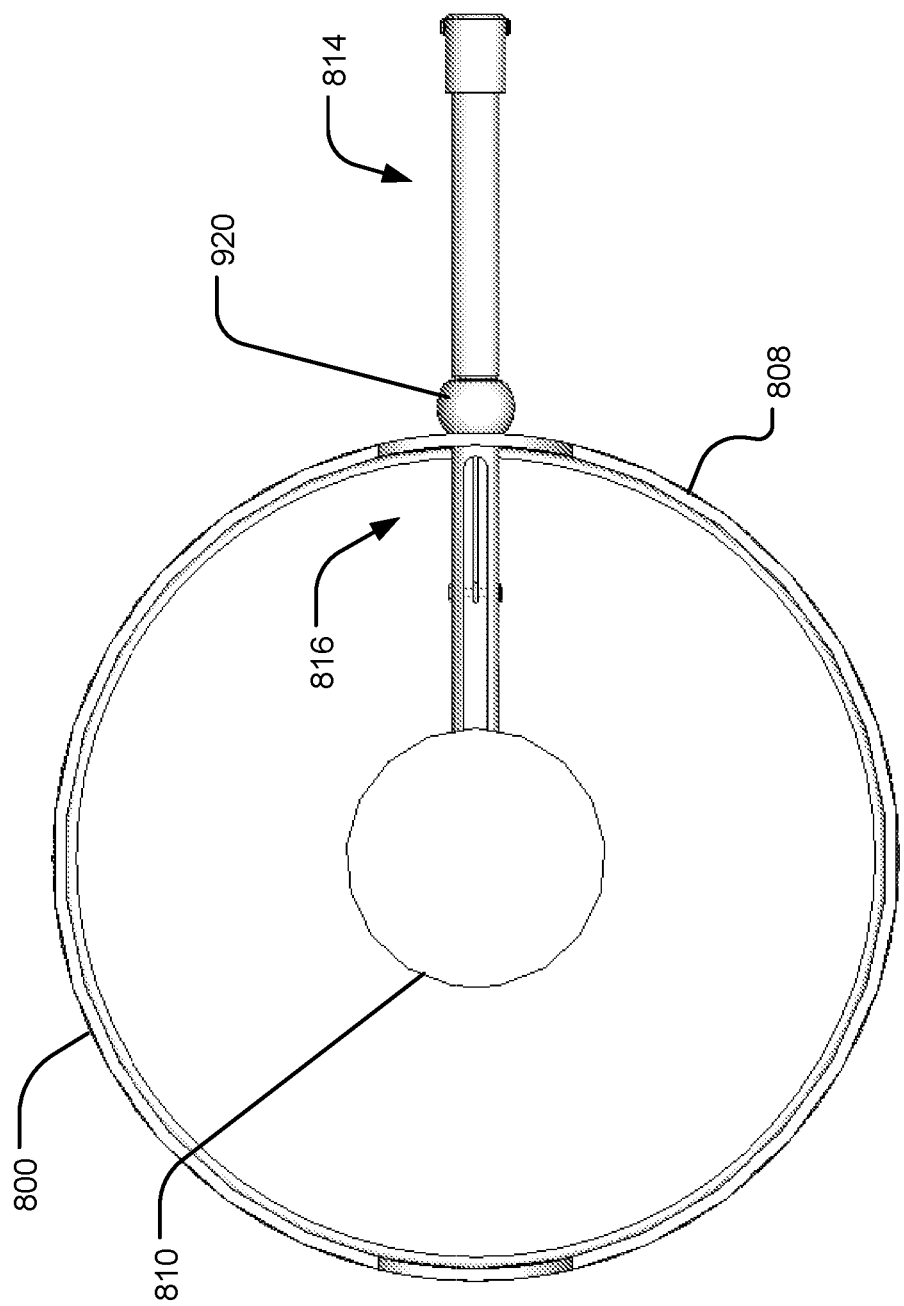
FIG. 10 is a top view of the collapsible perch and the base shown in FIG. 8.
Figure 11:
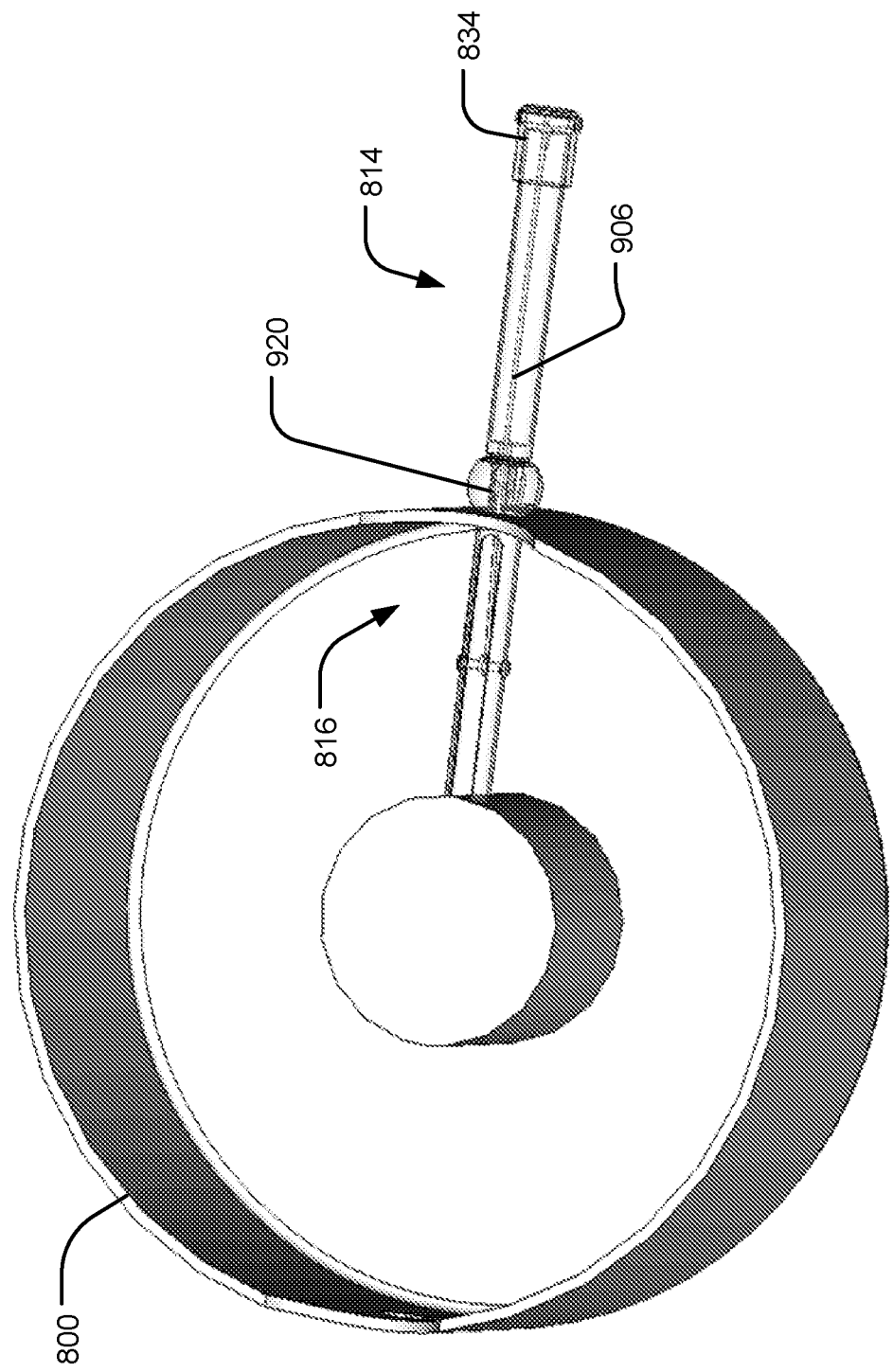
FIG. 11 is a perspective view of the collapsible perch and the base of FIG. 8 with portions of the collapsible perch shown transparent.

In the illustrated example, the collapsible member 220 is slightly curved at a pair of edges 228 parallel to the pair of perches 102, 104 to bias the collapsible member 220 in an initial position, which is generally parallel with the base surface 200. When one of the first perch 102 or the second perch 104, or both, receive a force greater than a threshold force of the collapsible member 220, the collapsible member 220 bends at a first pivot point 230 or at a second pivot point 232, or both, respectively, thereby moving the first perch 102, the second perch 104, or both, from a feeding position 400 to a non-feeding position 402, shown in FIG. 4. The feeding position 400 is generally parallel with the base surface 200 and the non-feeding position 402 is angled from the base surface 200. Further, the collapsible member 220 will continue to collapse through the first slot 206, the second slot 208, or both, until the collapsible member 220 engages the surface stop 218 of the base first stop 212 and/or the base second stop 214. In other words, the base first stop 212 and/or the base second stop 214 arrest the further collapse of the collapsible member 220, thereby preventing the collapsible member 220 from bending to fatigue, where the collapsible member 220 will no longer be able to return to the initial position. When the force is released, the collapsible member 220 returns to the initial position, thereby moving the first perch 102 and/or the second perch 104 from the non-feeding position 402 to the feeding position 400. The first pivot point 230 and the second pivot point 232 are positioned between the center attachment point 222 and the first attachment point 225 and the second attachment point 227, respectively. In the illustrated example, the first pivot point 230 and the second pivot point 232 are disposed at the base first stop 212 and the base second stop 214, respectively.

Turning to FIGS. 5A-8, a base cap 500 is shown. The base cap 500 generally covers the collapsible member 220 and the pair of perches 102, 104 to prevent feed from interfering with the use of the pair of perches 102, 104 and/or to prevent feed from falling through the pair of slots 206, 208. The base cap 500 has a generally circular roof 502 with a cap wall 504 extending from the roof 502 at a perimeter 506. Each of a pair of perch openings 508, 510 is disposed on opposing sides of the roof 502 and each opening 508, 510 align with the reservoir 101 perch openings 128, 130. The base cap 500 also includes a plurality of fastener receivers disposed on the roof 502. The plurality of fastener receivers includes a center fastener receiver 512 and a pair of opposing receivers 514, 516. Each of the plurality of receivers 512, 514, 516 includes supporting walls 518. When the base cap 500 is disposed on the base 112, the plurality of receivers 512, 514, 516 receive a center fastener 520, visible in FIG. 7, which couples the collapsible member 220 to the base 112, and a pair of opposing fasteners 522, 524, which couple the base 112 to the base cap 500.

Turning to FIGS. 8-11, another implementation of a base 800 and a collapsible perch 802 are shown, which can be mounted to the reservoir 101 shown in FIG. 1. The base 800 is generally circular shaped with a base surface 804 extending to a perimeter 806. The base 800 also includes a wall 808 extending from the base surface 804 at the perimeter 806 and a center column 810 extending from a center 812 of the base 800 in the same direction as the wall 808.

The collapsible perch 802 includes an outer perch 814 in communication with an elongated member 816. The outer perch 814 includes a perch body 815 extending from a perch first end 818 to a perch second end 820. The perch body 815 also includes a perch surface 822, providing a surface for a bird to perch on while accessing feed from the interior reservoir 116 of the reservoir 101. The elongated member 816 similarly includes an elongated body 824 extending from an elongated first end 826 to an elongated second end 828. The elongated member 816 may also include a slit 830 in the elongated body 824. The elongated first end 826 is attached to the center column 810 at a center attachment point 832, thereby providing a rigid support for the outer perch 814. The collapsible perch 802 can also include a cap 834 disposed on the perch second end 820.

Referring to FIGS. 9A-9B, a side, cross-sectional view of the collapsible perch 802 and the base 800 and a top, detailed view of the collapsible perch 802 are illustrated. In the illustrated embodiment, the perch first end 818 is a male protrusion 900 received by a female receiver 1002 of the elongated second end 828. The female receiver 902 includes a receiver slot 904, which provides an opening so that the male protrusion 900 can pivot, thereby pivoting the outer perch 814. The outer perch 814 is held in tension with the elongated member 816 by a collapsible member 906 fastened at a member first end 912 to the elongated member 816, extending through a perch bore 908 of the outer perch 814 and an elongated bore 910 of the elongated member 816, and fastened at a member second end 914 to the cap 834. In another example, the collapsible member 906 can be fastened at the member second end 914 to the perch body 814. More specifically, the member first end 912 is affixed to a first attachment point 916 disposed between the center attachment point 832 and the wall 808 and the member second end 914 is affixed to a second attachment point 918 disposed at the cap 834. The member first end 912 and the member second end 914 may be coupled to a bar affixed in the elongated member 816 and the cap 834, respectively, as illustrated, however, the member first end 912 and the member second end 914 may be coupled to the elongated member 816 and the cap 834 in other ways, such as by adhesion, rivets, or the like.

The collapsible member 906 exerts an elastic force on the outer perch 814 to bias the outer perch 814 in a feeding position. In the illustrated example, the collapsible member 906 is an elastic cord. The collapsible member 906 is bendable such that when the outer perch 814 receives a force greater than a threshold force of the collapsible member 906, the collapsible member 906 will bend, thereby pivoting the outer perch 814 at a pivot point 920 from the feeding position to a non-feeding position. In the illustrated example, the feeding position is parallel to the elongated member 816 whereas the non-feeding position is generally perpendicular to the elongated member 816. In the illustrated example, the pivot point 920 is disposed outside of the base 800 and between the first attachment point 916 and the second attachment point 918.

Figure 12:
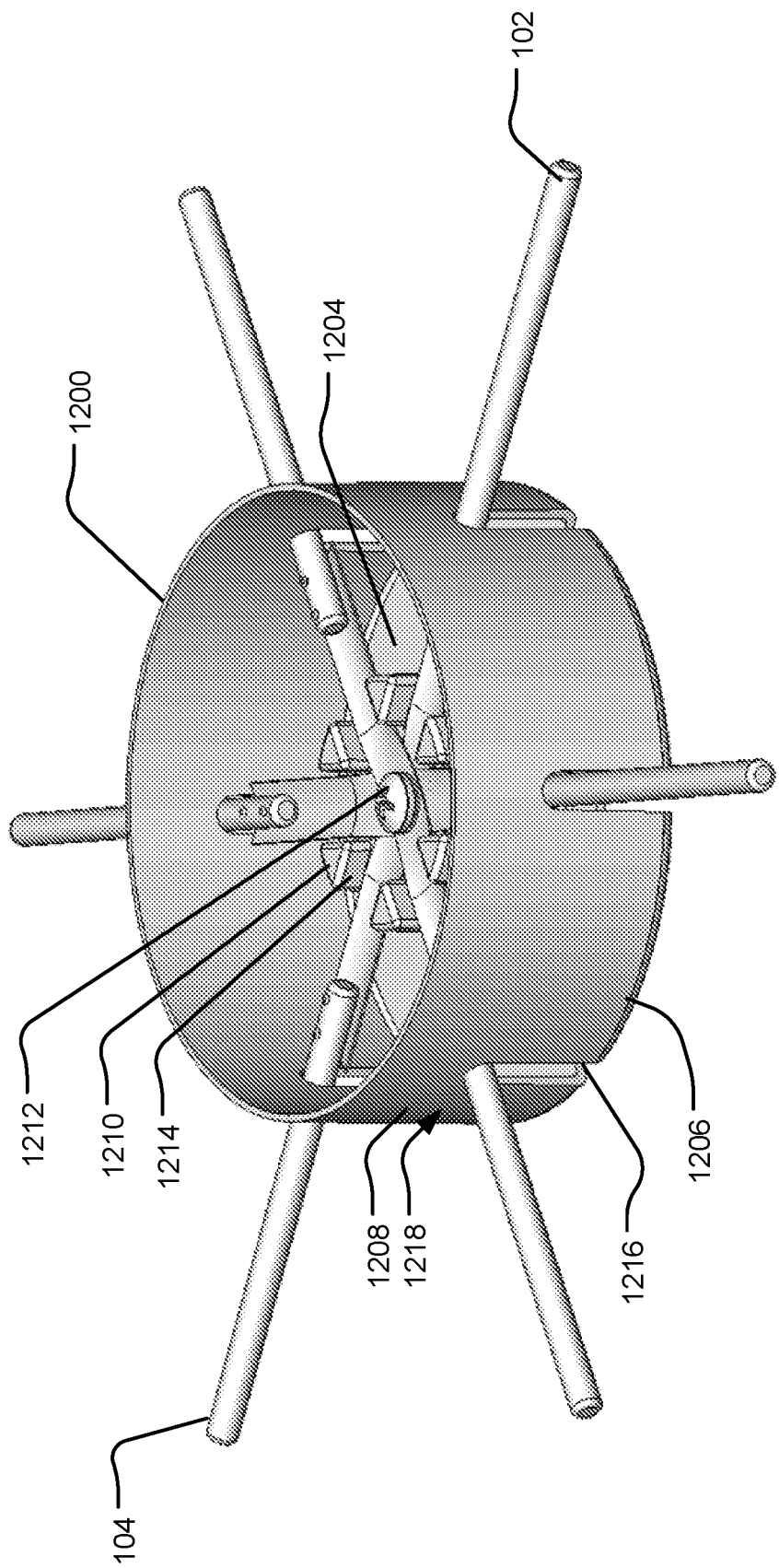
FIG. 12 is a perspective view of another implementation of a plurality of collapsible perches and a base.
Figure 13:
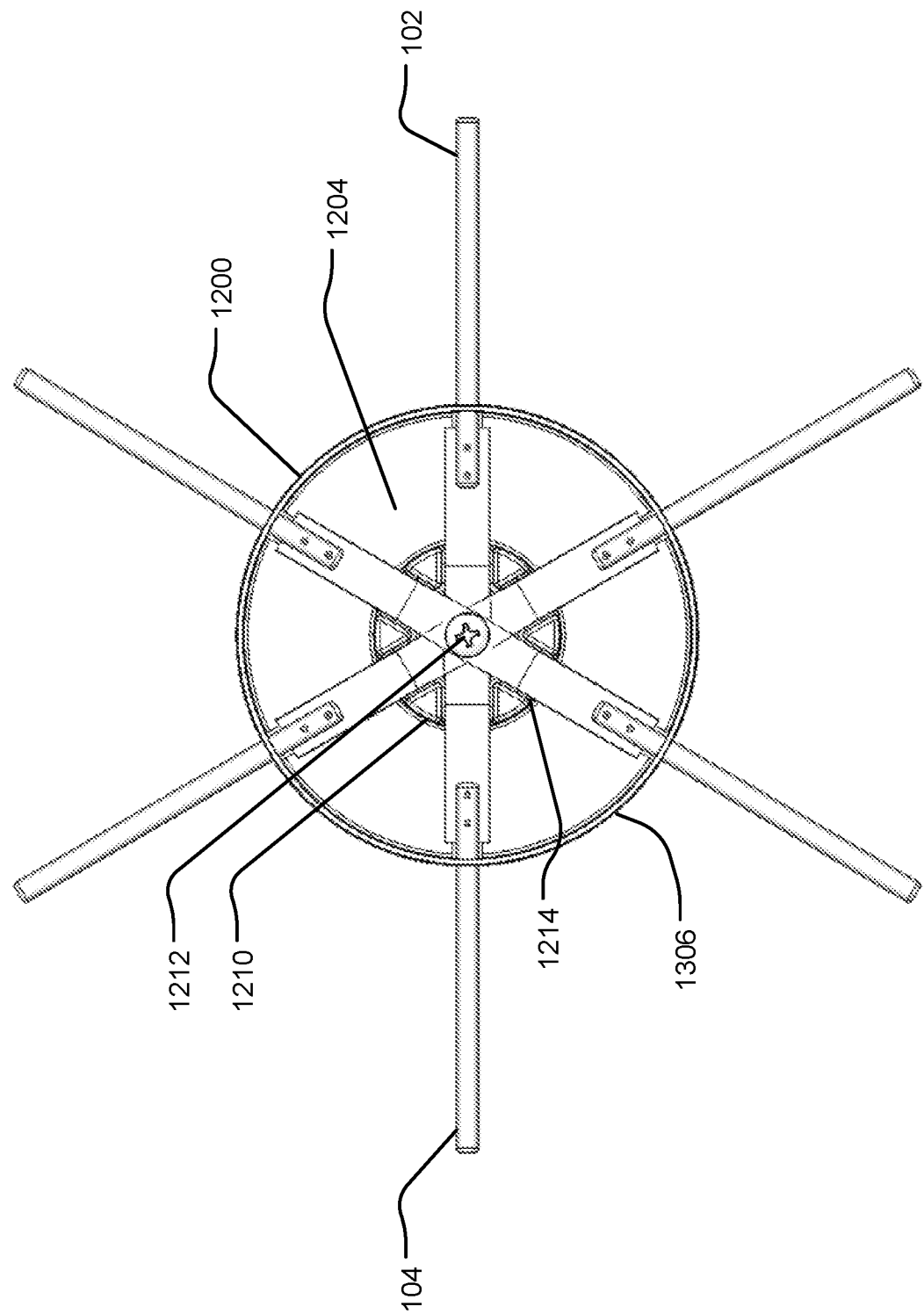
FIG. 13 is a top view of the plurality of collapsible perches and the base shown in FIG. 12.
Figure 14:
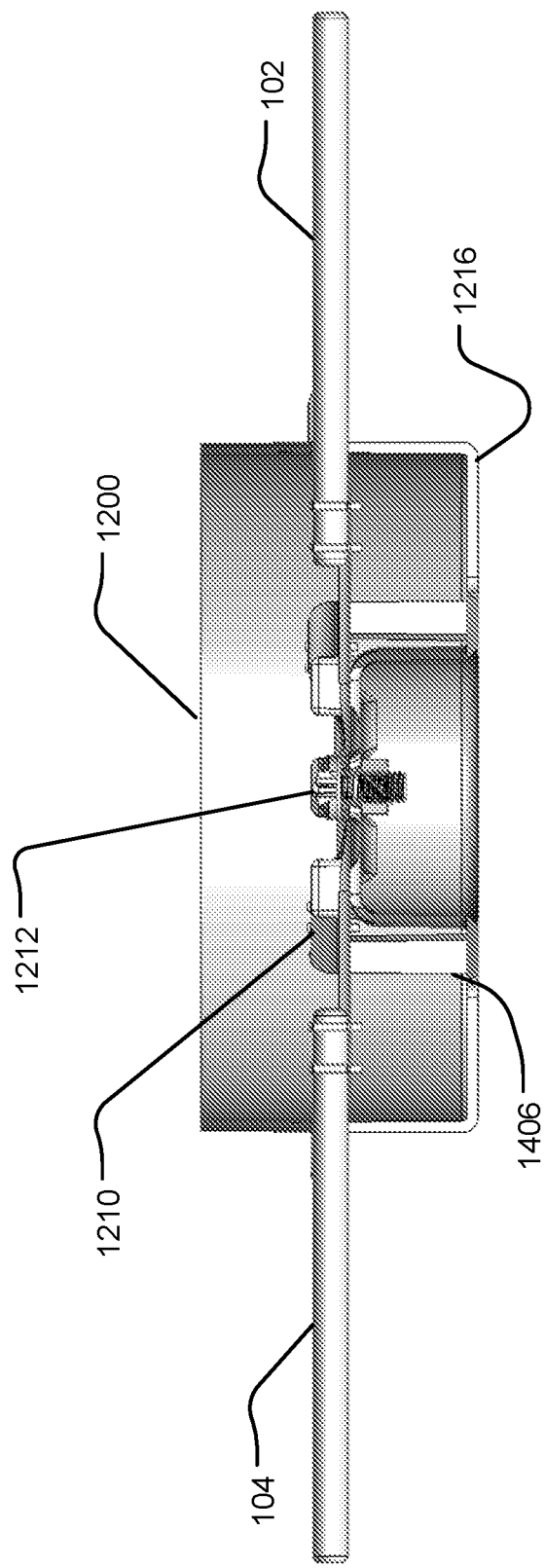
FIG. 14 is a side, cross-sectional view of the plurality of collapsible perches and the base shown in FIG. 12.

Turning to FIGS. 12-14, another example base 1200 and a plurality of collapsible perches 102, 104 are illustrated. The base 1200 is generally circular shaped with a base surface 1204 extending to a perimeter 1206. The base 1200 also includes a wall 1208 extending from the base surface 1204 at the perimeter 1206 and a center column 1210 extending from a center 1212 of the base 1200 in the same direction as the wall 1208. The center column 1210 includes a plurality of indentations 1214, each of the indentations 1214 sized and shaped to receive five collapsible members 220 as described previously and shown in FIGS. 1-4. The five collapsible members 220 are arranged in a star pattern when viewed from above, as shown in FIG. 13. Each of the collapsible members 220 include a pair of perches 102, 104 disposed on each end. Each of the collapsible members 220 are also fastened to the center column 1210 at the center 1212. Each collapsible member 220 further includes a pivot point 1220 disposed at a perimeter 1222 of the center column 1210, the pivot point 1220 being the point where the collapsible member bends 220. The wall 1208 includes slots 1216 extending from the perimeter 1206 and towards the center 1212 in a first direction and in a second direction perpendicular to the first direction and through the wall 1208 to a mid-way portion 1218 of the wall 1208. Each of the pair of perches 102, 104 extend through each slot 1214. Similarly to the slots 206, 208 previously described and shown in FIGS. 1-4, the slots 1216 provide an opening in the base 1200 for each perch 102, 104 and collapsible member 220 to pivot through when a perch 102, 104 receives a force greater than a threshold force of the respective collapsible member 220.

Figure 15:
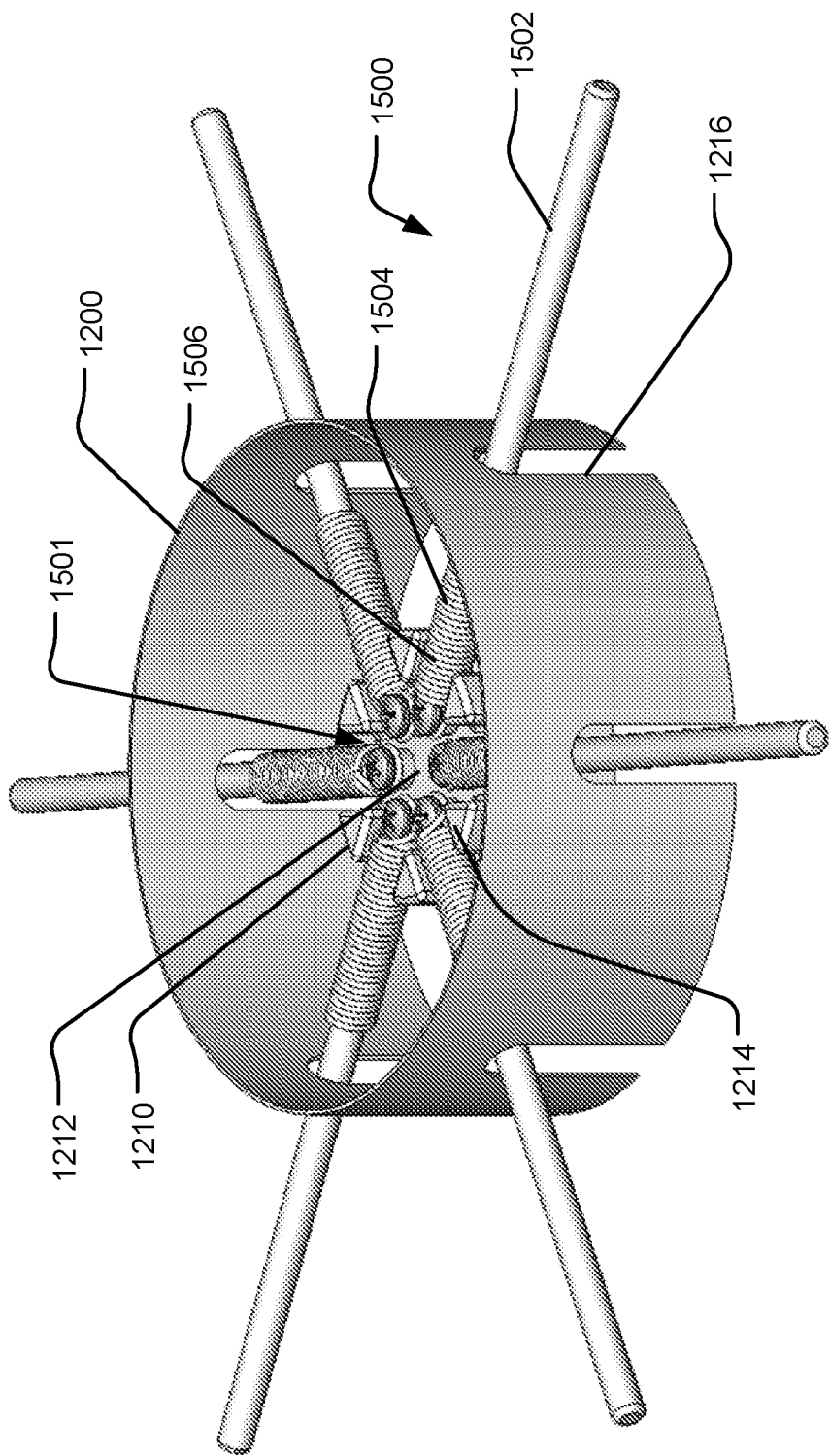
FIG. 15 is a perspective view of an additional implementation of a plurality of collapsible perches with springs and a base.
Figure 16:
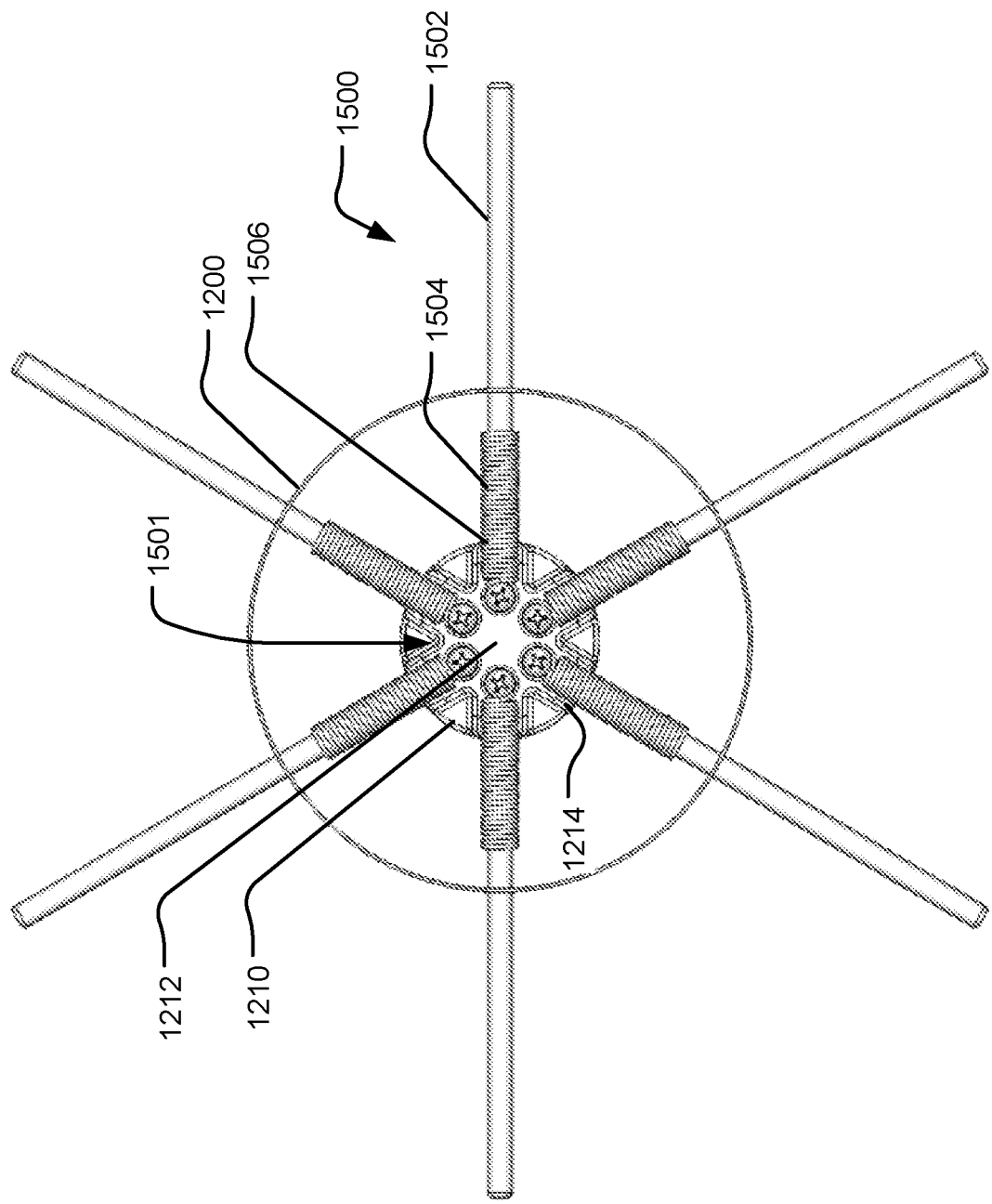
FIG. 16 is a top view of the plurality of collapsible perches and the base shown in FIG. 15.
Figure 17:
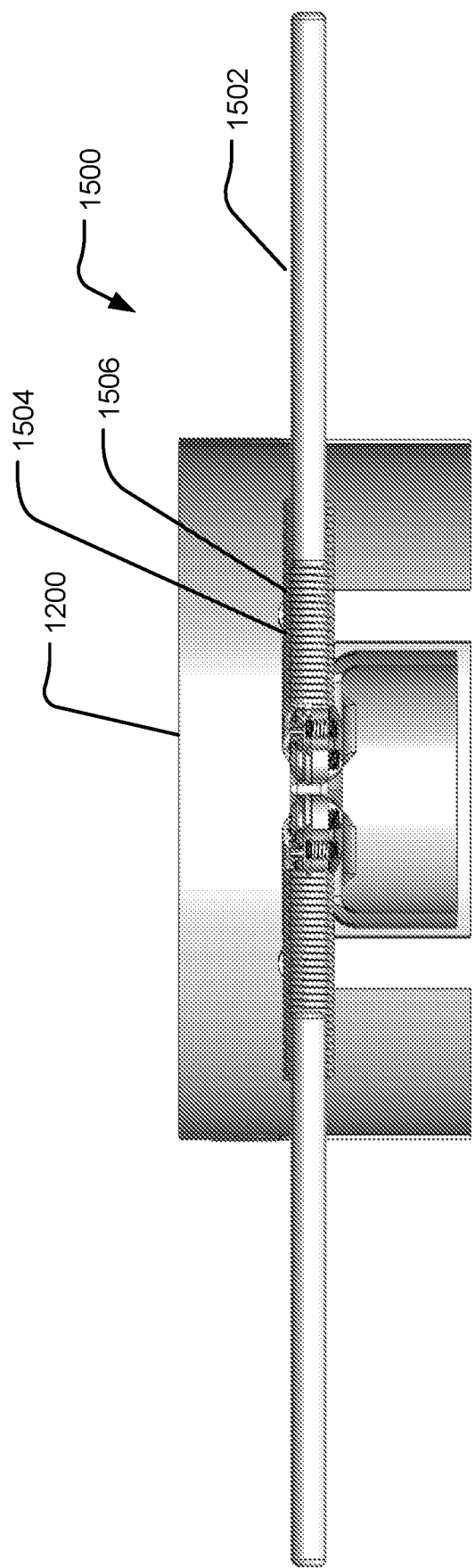
FIG. 17 is a side, cross-sectional view of the plurality of collapsible perches and the base shown in FIG. 15.

Turning to FIGS. 15-17, the base 1200 is shown with an example plurality of collapsible perches 1500. The base 1200 is generally similar to the base 1200 as described above with respect to FIGS. 12-14, except the indentations 1214 are shape and sized to receive a spring 1504 of the collapsible perches 1500. The plurality of collapsible perches 1500 each include an outer perch 1502 coupled to the spring 1504. Each outer perch 1502 extends away from the center column 1210 and through each slot 1214. Each spring 1504 is fixed to the center column 1210 along a second perimeter 1501 surrounding the center 1212 of the base 1200. Each spring 1504 also includes a pivot point 1506 disposed at the perimeter 1222 of the center column 1210, the pivot point 1506 being the point where the spring 1504 bends. The spring 1504 exerts a spring bias on the outer perch 1502 to keep the outer perch 1502 in an initial feeding position. When the outer perch 1502 receives a force to overcome the spring bias, the spring 1504 bends, thereby moving the outer perch 1502 from the feeding position to a non-feeding position. When the force is removed, the spring bias moves the outer perch 1502 from the non-feeding position to the feeding position.

Figure 18:
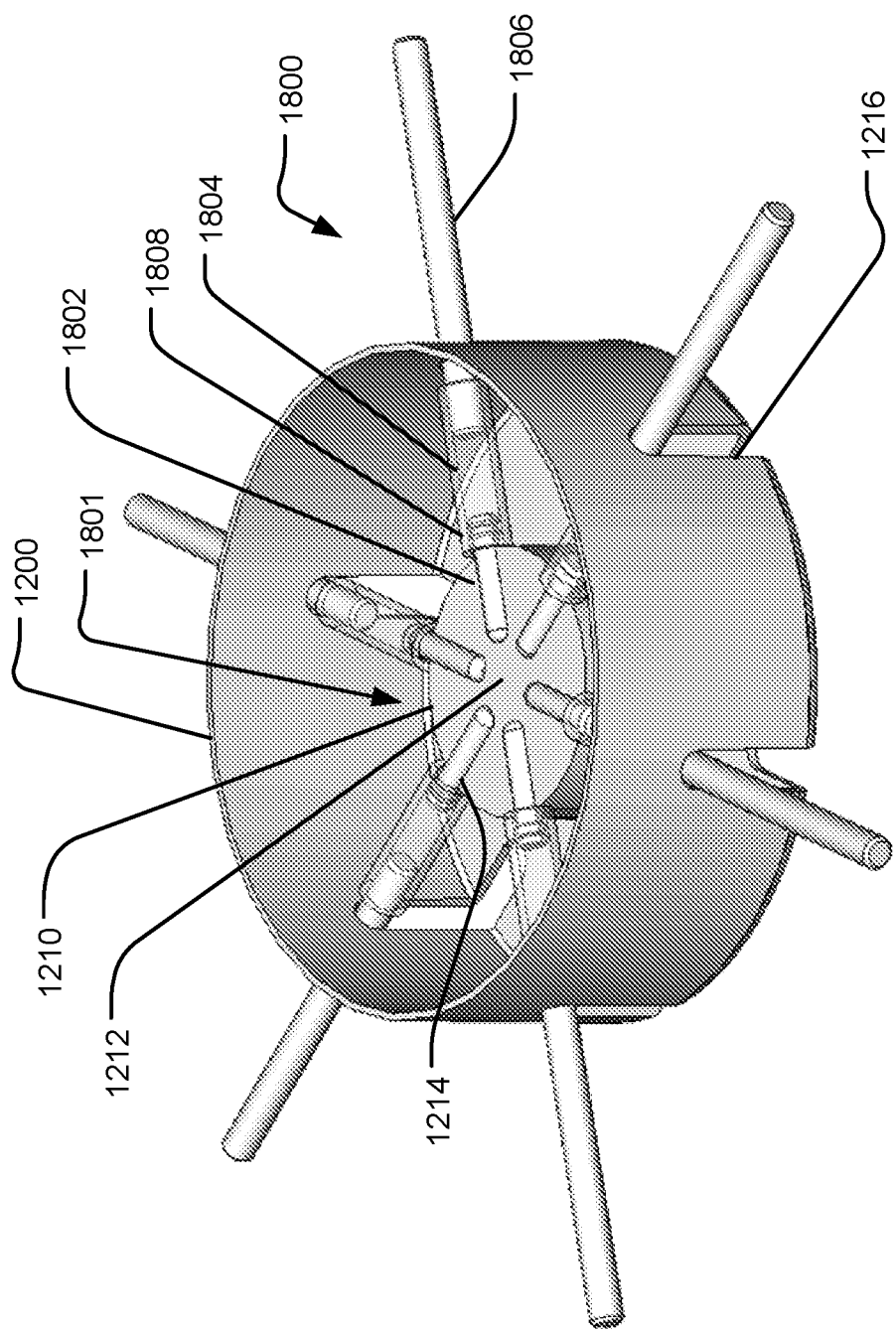
FIG. 18 is a perspective view of another implementation of a plurality of collapsible perches with elastic members and a base.
Figure 19:
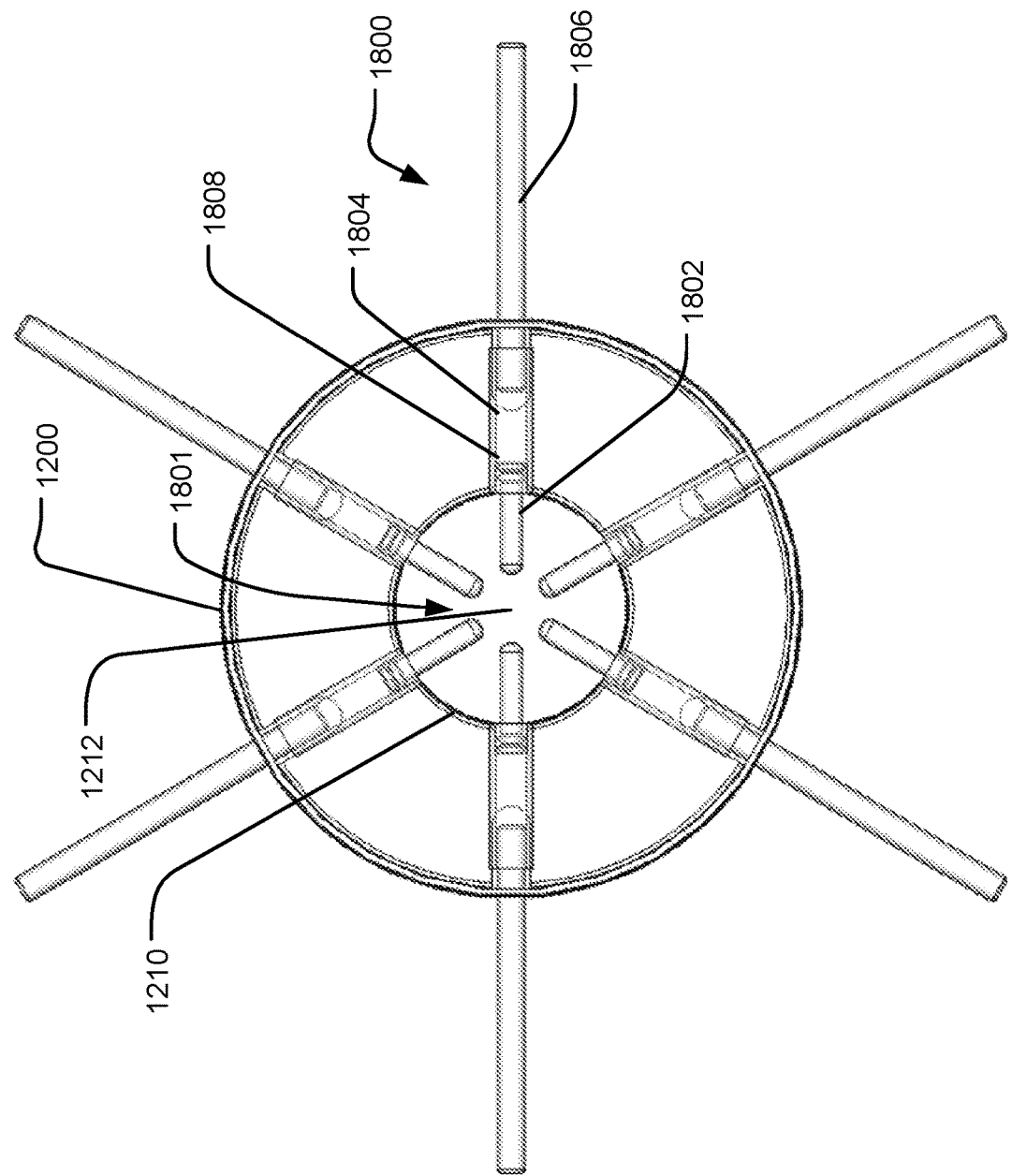
FIG. 19 is a top view of the plurality of collapsible perches and the base shown in FIG. 18.
Figure 20:
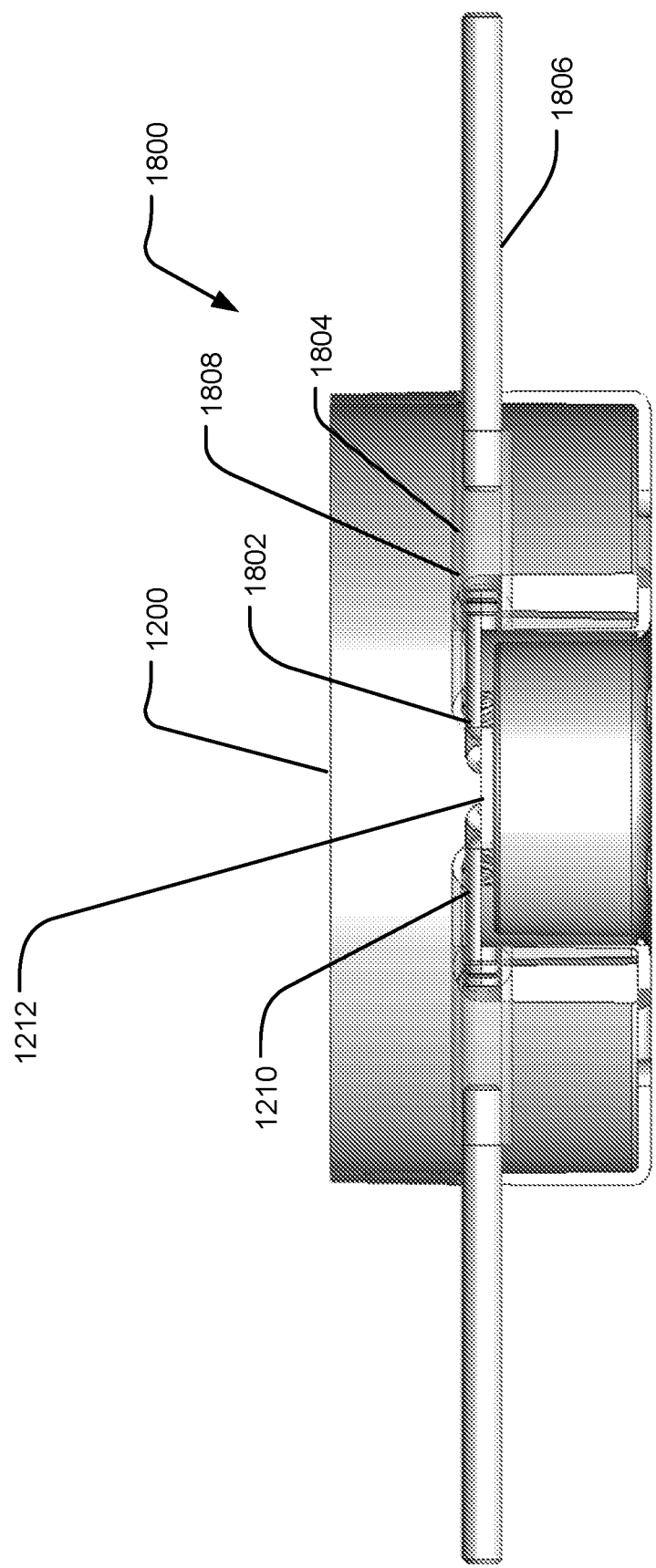
FIG. 20 is a side, cross-sectional view of the plurality of collapsible perches and the base shown in FIG. 18.

Turning to FIGS. 18-20, the base 1200 is shown with an example plurality of collapsible perches 1800. The base 1200 is generally similar to the base 1200 as described above with respect to FIGS. 12-14, except the indentations 1214 are shape and sized to receive an inner rod 1802 of the collapsible perches 1500. The plurality of collapsible perches 1800 each include a bendable member 1804 coupled to an outer perch 1806 at one end and to the inner rod 1802 at the other end. Each inner rod 1802 is fixed to the center column 1210 along a second perimeter 1801. Each outer perch 1806 extends away from the center column 1210 and through each slot 1214. Each bendable member 1804 includes a pivot point 1808 spaced away from the perimeter 1222 of the center column 1210, the pivot point 1808 being the point where the bendable member 1804 bends. The bendable member 1804 exerts a bias on the outer perch 1806 to keep the outer perch 1806 in an initial feeding position. When the outer perch 1806 receives a force to overcome the bias, the bendable member 1804 bends, thereby moving the outer perch 1806 from the feeding position to a non-feeding position. When the force is removed, the bias moves the outer perch 1806 from the non-feeding position to the feeding position.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A birdfeeder comprising:
a perch having a perch body extending from a perch first end to a perch second end; and
a collapsible member configured to be mounted to a base at a first attachment point, the first attachment point disposed inward relative to a base edge and a base surface of the base, the collapsible member configured to be mounted to the perch at a second attachment point, the collapsible member having a pivot point defined between the first attachment point and the second attachment point, the collapsible member configured to move the perch from a feeding position to a non-feeding position by pivoting at the pivot point upon an application of a force above a threshold on the perch body of the perch.

2. The bird feeder of claim 1, wherein a slot is defined in the base.

3. The birdfeeder of claim 1, wherein the collapsible member is mounted to a second perch at a third attachment point, the collapsible member having a second pivot point defined between the first attachment point and the third attachment point.

4. The birdfeeder of claim 1, wherein the first attachment point is disposed at a center of the base.

5. The birdfeeder of claim 1, wherein the second attachment point is disposed inward relative to the base edge.

6. The birdfeeder of claim 1, wherein the pivot point is defined relative to a center column of the base.

7. The birdfeeder of claim 1, wherein the collapsible member includes a spring.

8. The birdfeeder of claim 1, wherein the collapsible member includes a strip of metal.

9. The birdfeeder of claim 1, wherein the collapsible member includes a bendable member.

10. The birdfeeder of claim 1, wherein the collapsible member includes a rod.

11. The birdfeeder of claim 1, wherein the collapsible member includes an elastic cord.

12. The birdfeeder of claim 1, wherein the second attachment point is disposed at the perch second end.

13. A bird feeder comprising:
a housing having a sidewall;
a perch having a perch body extending from a perch first end to a perch second end;
a collapsible member mounted to the housing at a first attachment point, the first attachment point disposed inward relative to the sidewall, the collapsible member being mounted to the perch at a second attachment point, the collapsible member having a pivot point defined between the first attachment point and the second attachment point, the collapsible member moving the perch from a feeding position to a non-feeding position by pivoting at the pivot point upon an application of a force above a threshold on the perch body of the perch, the pivot point being disposed relative to a stop, the collapsible member pivoting from the feeding position in a direction towards the non-feeding position until a surface of the collapsible member contacts the stop.

14. The birdfeeder of claim 13, wherein the first attachment point is disposed on a central axis extending longitudinally through a center of the housing.

15. The birdfeeder of claim 13, wherein the collapsible member is mounted to the base at the first attachment point.

16. The birdfeeder of claim 13, wherein the collapsible member is mounted to a central column.

17. The birdfeeder of claim 16, wherein the central column extends upwardly within the housing.

18. The bird feeder of claim 13, wherein the housing includes a reservoir connected to a base, the reservoir having the sidewall defining an interior.

19. The bird feeder of claim 18, wherein the interior is configured to hold a supply of bird seed, the supply of bird seed accessible from the interior through a feeder opening defined in the housing.

20. A bird feeder comprising:
a housing defining an interior;
a perch having a perch body extending from a perch first end to a perch second end;
a collapsible member mounted to the housing at a first attachment point, the first attachment point disposed in the interior, the collapsible member being mounted to the perch at a second attachment point, the collapsible member having a pivot point defined between the first attachment point and the second attachment point, the collapsible member moving the perch from a feeding position to a non-feeding position by pivoting at the pivot point upon an application of a force above a threshold on the perch body of the perch.

* * * * *